US011470455B2

(12) United States Patent
Vagelos

(10) Patent No.: US 11,470,455 B2
(45) Date of Patent: Oct. 11, 2022

(54) DEVICE, SYSTEM, AND PROCESS FOR PROVIDING REAL-TIME SHORT MESSAGE DATA SERVICES FOR MISSION CRITICAL COMMUNICATIONS

(71) Applicant: TracFone Wireless, Inc., Miami, FL (US)

(72) Inventor: Theodore Vagelos, Miami, FL (US)

(73) Assignee: Tracfone Wireless, Inc., Miami, FL (US)

( * ) Notice: Subject to any disclaimer, the term of this patent is extended or adjusted under 35 U.S.C. 154(b) by 0 days.

(21) Appl. No.: 17/209,678

(22) Filed: Mar. 23, 2021

(65) Prior Publication Data

US 2021/0235236 A1 Jul. 29, 2021

Related U.S. Application Data

(63) Continuation of application No. 16/847,824, filed on Apr. 14, 2020, now Pat. No. 10,959,064, which is a continuation of application No. 15/435,560, filed on Feb. 17, 2017, now Pat. No. 10,623,914.

(60) Provisional application No. 62/296,356, filed on Feb. 17, 2016.

(51) Int. Cl.
*H04W 4/14* (2009.01)
*H04W 4/02* (2018.01)
*H04W 4/90* (2018.01)

(52) U.S. Cl.
CPC ............ *H04W 4/14* (2013.01); *H04W 4/025* (2013.01); *H04W 4/90* (2018.02)

(58) Field of Classification Search
CPC .......... H04W 4/14; H04W 4/025; H04W 4/90
See application file for complete search history.

(56) References Cited

U.S. PATENT DOCUMENTS

| 6,624,750 | B1* | 9/2003 | Marman | G08B 25/003 340/4.3 |
| 8,774,752 | B1* | 7/2014 | Akcasu | H04W 4/90 455/404.1 |
| 2007/0167147 | A1* | 7/2007 | Krasner | G08G 1/205 455/404.2 |
| 2009/0093240 | A1* | 4/2009 | Lang | H04L 12/1818 455/466 |
| 2009/0315699 | A1* | 12/2009 | Satish | H04L 47/125 340/533 |
| 2010/0105355 | A1* | 4/2010 | Nooren | H04W 12/08 455/410 |
| 2010/0161167 | A1 | 6/2010 | Leyerle | |

(Continued)

*Primary Examiner* — Minjung Kim

(57) ABSTRACT

A wireless device configured to transmit short data messages includes a transceiver configured to transmit and receive the short data messages, at least one sensor configured to detect at least one of a physical parameter, a user input, and a sensor input, and an application configured to encrypt the short data messages and configured to communicate with the at least one sensor. The wireless device further includes a processor configured to control the transceiver and to execute the application, the application is further configured to implement at least one of home security operations, personal emergency response operations, home automation operations, user location operations, fire alarm operations, vehicle telematics operations, and medical telematics operations, and a computer readable medium to store the application.

20 Claims, 4 Drawing Sheets

(56) References Cited

U.S. PATENT DOCUMENTS

| | | | |
|---|---|---|---|
| 2012/0243472 A1* | 9/2012 | Bienn | H04W 4/14 370/328 |
| 2014/0022385 A1* | 1/2014 | Fischer | G08B 17/125 348/143 |
| 2014/0028539 A1 | 1/2014 | Newham et al. | |
| 2014/0185806 A1 | 7/2014 | Mardikar | |
| 2014/0290110 A1* | 10/2014 | Stewart | F41A 17/46 42/70.11 |
| 2015/0080035 A1 | 3/2015 | Tanaka et al. | |
| 2015/0160635 A1* | 6/2015 | Schofield | G05B 11/01 700/90 |
| 2015/0189585 A1* | 7/2015 | Huber | H04B 1/3822 455/434 |
| 2015/0289116 A1* | 10/2015 | Lei | H04L 9/3242 380/270 |
| 2015/0342542 A1* | 12/2015 | An | G08B 25/016 455/404.2 |
| 2016/0029197 A1 | 1/2016 | Gellens | |
| 2020/0154252 A1* | 5/2020 | Buckley | H04W 8/005 |
| 2021/0014932 A1* | 1/2021 | Mbonye | H04W 36/0027 |

* cited by examiner

DEVICE, SYSTEM, AND PROCESS FOR PROVIDING REAL-TIME SHORT MESSAGE DATA SERVICES FOR MISSION CRITICAL COMMUNICATIONS

CROSS REFERENCE TO PRIOR APPLICATIONS

This application is a continuation of U.S. application Ser. No. 16/847,824 filed on Apr. 14, 2020, now U.S. Pat. No. 10,959,064, issued Mar. 23, 2021 which is hereby incorporated by reference for all purposes as if fully set forth herein; which application is a continuation of U.S. application Ser. No. 15/435,560 filed on Feb. 17, 2017, now U.S. Pat. No. 10,623,914, issued Apr. 14, 2020 which is hereby incorporated by reference for all purposes as if fully set forth herein; which application claims the benefit from U.S. Provisional Application No. 62/296,356 filed on Feb. 17, 2016, which is hereby incorporated by reference for all purposes as if fully set forth herein.

BACKGROUND OF THE DISCLOSURE

1. Field of the Disclosure

The disclosure relates to a device, system, and process for transmitting and processing short message data services for mission critical communications. More particularly, the disclosure relates to systems, devices, and methods for transmitting and processing short message data services in real-time for mission critical communications.

2. Related Art

Cellular data communications often rely on TCP/IP communications over a core IP Network, which is subject to failures that can delay or prevent the transmission of critical messages. In addition, the transmitting and processing of Short Message Services may often require protocols, systems, and networks which do not transmit in real-time and which can be prohibitively expensive. Moreover, utilization of plain old telephone service is typically slower for data transmission. Additionally, plain old telephone service is increasingly not utilized in many households.

More specifically, Short Message Service (SMS) messages and short data messages may be communicated with TCP/IP communications over a core IP network, which may fail at unacceptable rates. SMS messages also may be transmitted with a "store and forward" technology, and may not be transmitted and received in real-time. While dial-up data service exists, consumers may no longer have a home phone which may utilize this service. Even for consumers who do use dial-up service, however, the data connection may take too long to connect and sync. In addition, point-to-point data circuits may be utilized, but those can be prohibitively expensive.

Many devices and/or services rely on data communications to provide mission critical communications. Convenience, timeliness, and reliability of the wireless data services are key factors that play into safety, reliability, and/or a user's experience.

Accordingly, there is a need to provide real-time data communications for devices and services that rely on mission critical communications.

SUMMARY OF THE DISCLOSURE

The foregoing needs are met, to a great extent, by the disclosure, providing a device, system, and method for transmitting and processing short message data services in real-time.

According to some aspects of the disclosure, a wireless device configured to transmit short data messages includes a transceiver configured to transmit and receive the short data messages, at least one sensor configured to detect at least one of a physical parameter, a user input, and a sensor input, and an application configured to encrypt the short data messages and configured to communicate with the at least one sensor. The wireless device further includes a processor configured to control the transceiver and to execute the application, the application is further configured to implement at least one of the following: home security operations, personal emergency response operations, home automation operations, user location operations, fire alarm operations, vehicle telematics operations, and medical telematics operations, and a computer readable medium to store the application.

According to some aspects of the disclosure, a process for transmitting short data messages with a wireless device includes transmitting and receiving the short data messages with a transceiver, sensing with at least one sensor at least one of the following: a physical parameter, a user input, and a sensor input, encrypting the short data messages with a processor, communicating with the at least one sensor, implementing with the processor an application, the application configured to implement at least one of the following: home security operations, personal emergency response operations, home automation operations, user location operations, fire alarm operations, vehicle telematics operations, and medical telematics operations, and storing the application in a computer readable medium.

There has thus been outlined, rather broadly, certain aspects of the disclosure in order that the detailed description thereof herein may be better understood, and in order that the present contribution to the art may be better appreciated. There are, of course, additional aspects of the disclosure that will be described below and which will also form the subject matter of the claims appended hereto.

In this respect, before explaining at least one aspect of the disclosure in detail, it is to be understood that the disclosure is not limited in its application to the details of construction and to the arrangements of the components set forth in the following description or illustrated in the drawings. The disclosure is capable of aspects in addition to those described and of being practiced and carried out in various ways. Also, it is to be understood that the phraseology and terminology employed herein, as well as the abstract, are for the purpose of description and should not be regarded as limiting.

As such those skilled in the art will appreciate that the conception upon which this disclosure is based may readily be utilized as a basis for the designing of other structures, methods and systems for carrying out the several purposes of the disclosure. It is important, therefore, that the claims be regarded as including such equivalent constructions insofar as they do not depart from the spirit and scope of the disclosure.

BRIEF DESCRIPTION OF THE DRAWINGS

The above mentioned features and aspects of the disclosure will become more apparent with reference to the following description taken in conjunction with the accompanying drawings wherein like reference numerals denote like elements and in which.

DETAILED DESCRIPTION

Figure 1:
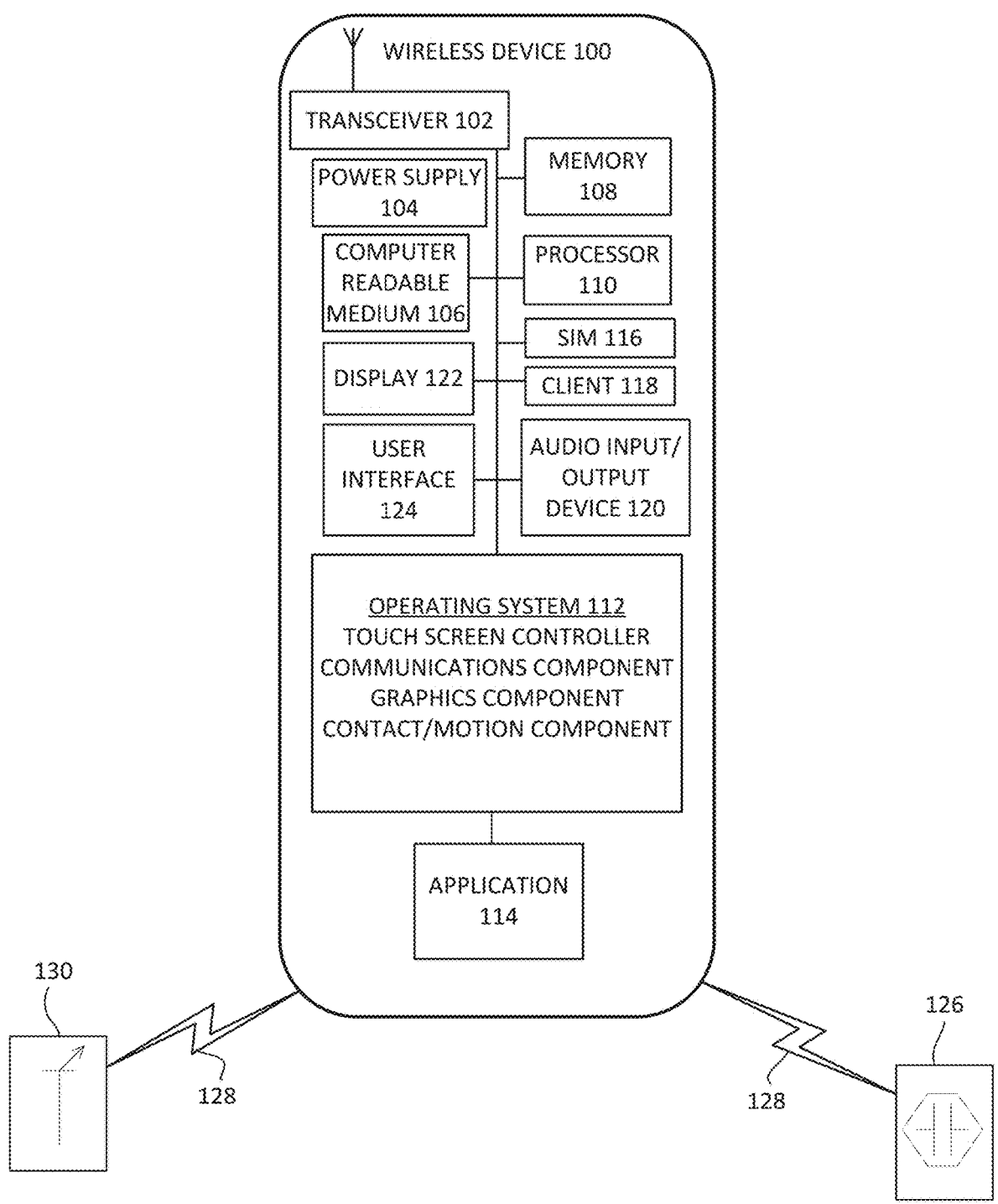
FIG. 1 illustrates a wireless device and its associated components, in accordance with aspects of the present disclosure.

In this specification and in the claims it is to be understood that reference to a wireless device is intended to encompass electronic devices such as security systems, alarm systems, home automation systems, personal emergency response systems, vehicular telematics systems, child tracking systems, elder tracking systems, medical telematics systems, fire alarm and control systems, consumer monitoring systems, data capturing systems, environmental monitoring systems, infrastructure management monitoring systems, manufacturing systems, energy management systems, medical and healthcare systems, transportation systems, monitoring systems, systems implemented as an Internet of Things, systems benefiting from mission critical data communications, systems benefiting from a real-time and data communications, mobile phones, controllers, tablet computers, personal computers, PDAs, and the like. A "wireless device" is intended to encompass any compatible mobile technology computing device that can connect to a wireless communication network. A wireless device further includes mobile phones, mobile equipment, mobile stations, user equipment, cellular phones, smartphones, handsets, or the like (e.g., Apple iPhone, Google Android based devices, BlackBerry based devices, other types of PDAs or smartphones), wireless dongles, remote alert devices, or other mobile computing devices that may be supported by a wireless network. The term "wireless device" may be interchangeably used and referred to herein as "wireless handset," "handset," "mobile device," "device," "mobile phones," "mobile equipment," "mobile station," "user equipment," "cellular phone," "smartphones," "monitoring device" or "phone."

Wireless devices may connect to a "wireless network" or "network" and are intended to encompass any type of wireless network to obtain or provide mobile phone and messaging services through the use of a wireless device, such as the Global System for Mobile Communication (GSM) network, Code-Division Multiple Access (CDMA) network, Long-Term Evolution (LTE) network, 5G (Fifth Generation), and the like that may utilize the teachings of the present application to transmit and process short message data services.

Reference in this specification to "one aspect," "an aspect," "other aspects," "one or more aspects" or the like means that a particular feature, structure, or characteristic described in connection with the aspect is included in at least one aspect of the disclosure. The appearances of, for example, the phrase "in one aspect" in various places in the specification are not necessarily all referring to the same aspect, nor are separate or alternative aspects mutually exclusive of other aspects. Moreover, various features are described which may be exhibited by some aspects and not by others. Similarly, various requirements are described which may be requirements for some aspects but not for other aspects.

One aspect of the disclosure is to use the cellular signaling system to transport real-time short data messages. For example, using GSM Terms, utilize Unstructured Supplementary Service Data (USSD) services to transmit short data messages between machines. In this regard, these messages may be transmitted up to seven times faster than SMS messages, are transmitted in real-time, do not require TCP/IP headers, are transmitted over a device authenticated, 128 bit secure encrypted network, are carrier agnostic, and have a high reliability.

FIG. 1 illustrates an exemplary wireless device 100 and its associated components. The wireless device 100 may include a transceiver 102, a power supply 104, a computer readable medium 106, a memory 108, a processor 110, an operating system 112, an application 114, and the like. The wireless device 100 may further include in some aspects a subscriber identity module (SIM) card 116, a client 118, an audio input/output device 120, a display 122, a user interface 124, and the like.

Figure 2:
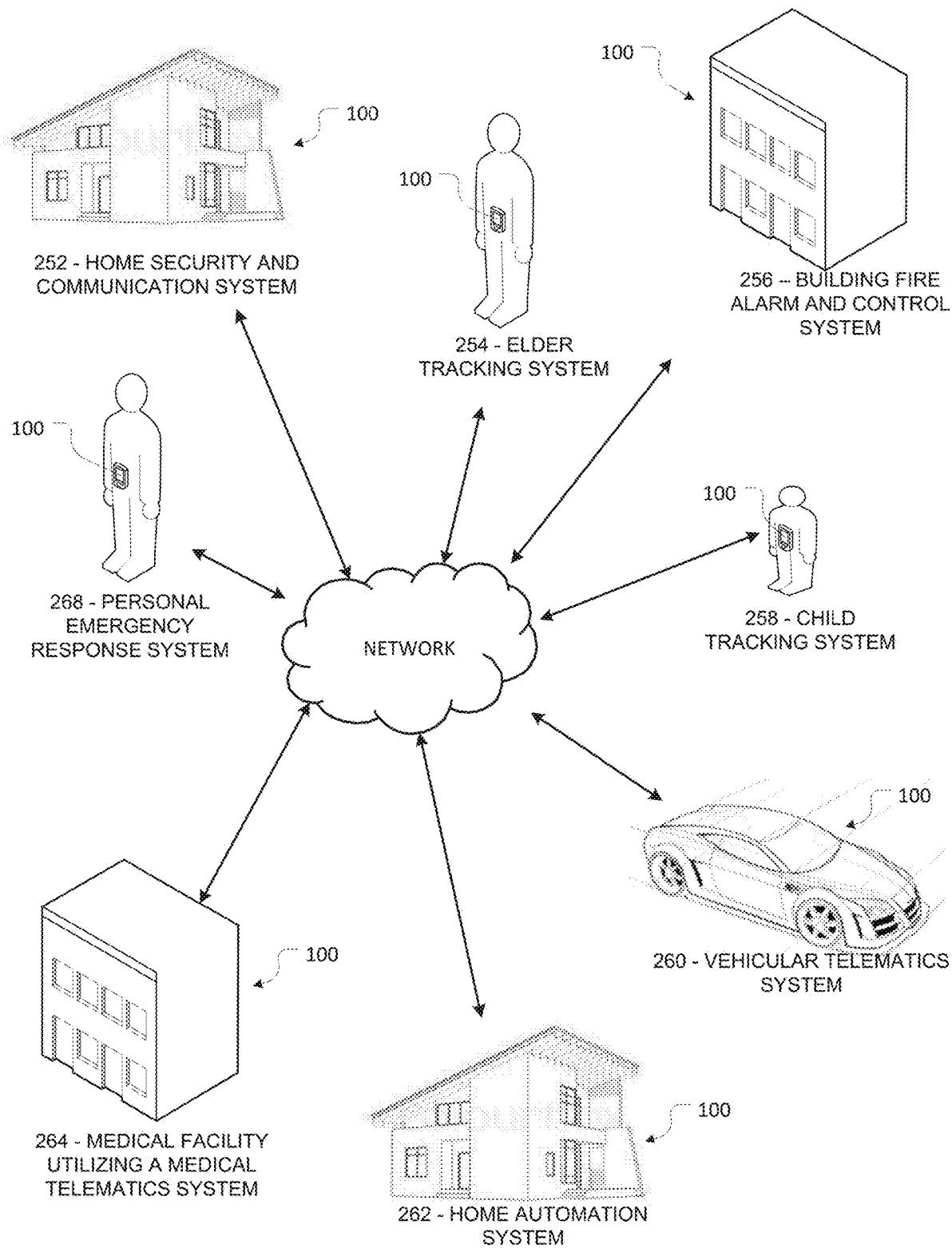
FIG. 2 illustrates various applications utilizing a cellular signaling system which may allow for reliable, real-time transmitting and processing of short data messages, in accordance with aspects of the disclosure.

FIG. 2 illustrates various applications utilizing a cellular signaling system which may allow for reliable, real-time transmitting and processing of short data messages, in accordance with aspects of the disclosure. In one aspect, the wireless device 100 may connect to or be operatively linked to a vehicle to provide vehicular telematics communications that may include a global navigation satellite system (GNSS) capability. For example, the wireless device 100 may be associated with a vehicular telematics system 260 and the wireless device 100 may provide real-time transmitting and processing of short data messages, in accordance with aspects of the disclosure. The application 114 that is implemented by the wireless device 100 may be further configured to provide vehicular telematics functionality. In this regard, the wireless device 100 and the application 114 are configured to implement the vehicle telematics operations. In one aspect, the wireless device 100 may be operatively linked to a vehicle. In one aspect, the sensor 126 may be configured to detect at least one of a vehicle location, vehicle safety data, and vehicle security data. The short data messages may include data related to the vehicle location, the vehicle safety data, and the vehicle security data.

The wireless device 100 may connect to or be operatively linked to a home security and communication system having door sensors, window sensors, motion detectors, and the like. For example, the wireless device 100 may be associated with a home security and communication system 252 and the wireless device 100 may provide real-time transmitting and processing of short data messages, in accordance with aspects of the disclosure. The application 114 that is implemented by the wireless device 100 may be further configured to provide home security functionality. In this regard, the wireless device 100 and the application 114 are configured to implement home security operations. In one aspect, the wireless device 100 is a home security system, the short data messages may include home security data, and the sensor 126 may include one or more of a door sensor, a window sensor, and a motion sensor.

The wireless device 100 may connect to or be operatively linked to a home automation system for controlling various systems within a home. For example, a home automation system may employ the wireless device 100 to communicate with one or more additional wireless devices 100 and/or with objects providing sensing, controlling, and/or detecting functions. For example, the wireless device 100 may be associated with a home automation system 262 and the wireless device 100 may provide real-time transmitting and processing of short data messages, in accordance with aspects of the disclosure. The application 114 that is implemented by the wireless device 100 may be further configured to provide home automation functionality. In this regard, the wireless device 100 and the application 114 are configured to implement the home automation operations. In one aspect, the wireless device 100 may be a home automation system. The short data messages may include home automation data. The wireless device 100 may be further configured to communicate with one or more other wireless devices.

The wireless device 100 may connect to or be operatively linked to a personal emergency response system that provides monitoring for elderly or infirm individuals that may include a global navigation satellite system (GNSS) capability. For example, the wireless device 100 may be associated with personal emergency response system 268 and the wireless device 100 may provide real-time transmitting and processing of short data messages, in accordance with aspects of the disclosure. The application 114 that is implemented by the wireless device 100 may be further configured to provide emergency response functionality. In this regard, the wireless device 100 and the application 114 are configured to implement the personal emergency response operations. In one aspect, the wireless device 100 is a personal emergency response system. The sensor 126 may be configured to receive a user input representing a physical health emergency. The short data messages may include data associated with a physical health emergency.

The wireless device 100 may connect to or be operatively linked to a child tracking system 258 that may include a global navigation satellite system (GNSS) capability. For example, the wireless device 100 may be associated with a child tracking system 258 and the wireless device 100 may provide real-time transmitting and processing of short data messages, in accordance with aspects of the disclosure. The application 114 that is implemented by the wireless device 100 may be further configured to provide child tracking functionality. In this regard, the wireless device 100 and the application 114 are configured to implement user location operations. In one aspect the wireless device 100 may be further configured to track a location of a user. The short data messages may include location data.

The wireless device 100 may connect to or be operatively linked to an elder tracking system 254 that may include a global navigation satellite system (GNSS) capability. For example, the wireless device 100 may be associated with an elder tracking system 254 and the wireless device 100 may provide real-time transmitting and processing of short data messages, in accordance with aspects of the disclosure. The application 114 that is implemented by the wireless device 100 may be further configured to provide elder tracking functionality. In this regard, the wireless device 100 and the application 114 are configured to implement user location operations. In one aspect the wireless device 100 may be further configured to track a location of a user. The short data messages may include location data.

The wireless device 100 may connect to or be operatively linked to a medical telematics system 264 that may be configured to monitor medical equipment and/or a medical condition of individuals. For example, the wireless device 100 may be associated with a medical facility utilizing a medical telematics system 264 and the wireless device 100 may provide real-time transmitting and processing of short data messages, in accordance with aspects of the disclosure. The application 114 that is implemented by the wireless device 100 may be further configured to provide medical telematics functionality. In this regard, the wireless device 100 and the application 114 are configured to implement medical telematics operations. In one aspect, the sensor 126 may be configured to detect medical telematics. The short data messages may include medical data.

The wireless device 100 may connect to or be operatively linked to a fire alarm and control system 256 configured to determine the presence of fires, smoke, and the like along with a capability to report the same. For example, the wireless device 100 may be associated with fire alarm and control system 256 and the wireless device 100 may provide real-time transmitting and processing of short data messages, in accordance with aspects of the disclosure. The application 114 that is implemented by the wireless device 100 may be further configured to provide fire alarm and control system functionality. In this regard, the wireless device 100 and the application 114 are configured to implement fire alarm operations. In one aspect, the wireless device 100 is a fire alarm and the short data messages may include fire alerts that may include fire alerts, smoke alerts, noxious gas alerts, earthquake alerts, and the like.

In one aspect, the wireless device 100 may connect to or be operatively linked to home items such as appliances, media components, HVAC systems, and the like. The wireless device 100 may be part of an Internet of Things in which objects and/or locations may be monitored and sensed, and may be in communication with one another and/or with the wireless device 100 and/or other wireless devices. The application 114 that is implemented by the wireless device 100 may be further configured to provide functionality consistent with the appliances, components, and systems.

Returning back to FIG. 1, the transceiver 102 of the wireless device 100 can include, for example, a wireless antenna and associated circuitry capable of data transmission with the mobile data network utilizing at least one data transmission protocol, such as, for example, 3G, 4G Long Term Evolution (LTE), 5G, Evolution-Data Optimized (EVDO), Code Division Multiple Access (CDMA), High Speed Packet Access (HSPA), Global System for Mobile Communications (GSM), W-CDMA (Wideband Code-Division Multiple Access), Wi-Fi, Bluetooth, a communication channel as defined herein, and/or the like, and/or combinations thereof. The transceiver 102 may transmit and receive data, such as short message data services, commands, alerts, and the like over the data transmission protocol. An alert may include a fire alert, carbon monoxide alert, intruder alert, personal emergency alert, health alert, vehicle alert, location alert, and the like. The power supply 104 may be a battery such as nickel cadmium, nickel metal hydride, lead acid, lithium ion, lithium ion polymer, and the like. The power supply 104 may also be wired to a power receptacle, transmission line, or the like.

The computer readable medium 106 may be configured to store, for example, the application 114, phone numbers to automatically call, or addresses to transmit messages to in case of an alert. For the purposes of this disclosure, the computer readable medium 106 may store computer data, which may include computer program code that may be executable by the processor 110 of the wireless device 100 in machine readable form. By way of example, and not limitation, the computer readable medium 106 may include computer readable storage media, for example tangible or fixed storage of data, or communication media for transient interpretation of code-containing signals. Computer readable storage media, as used herein, refers to physical or tangible storage (as opposed to signals) and includes without limitation volatile and non-volatile, removable and non-removable storage media implemented in any method or technology for the tangible storage of information such as computer-readable instructions, data structures, program modules, or other data. In one or more aspects, the actions and/or events of a method, algorithm, or module may reside as one or any combination or set of codes and/or instructions on a computer readable medium 106 or machine readable medium, which may be incorporated into a computer program product.

The display 122 of the wireless device 100 can display various information provided to the display 122 from the processor 110, the computer readable medium 106, or the SIM card 116. The screen may be a light-emitting diode display (LED), an electroluminescent display (ELD), a plasma display panel (PDP), a liquid crystal display (LCD), an organic light-emitting diode display (OLED), or any other display technology.

The displayed information can include, for example, text and data messages, alert messages, confirmation messages, the network connection strength, the type of mobile network data connection (such as 3G, 4G LTE, 5G, EVDO, etc.) the wireless device 100 is connected to, and/or other information potentially useful to the user. The information may be displayed simultaneously or the user may interact with an input device such as buttons on the wireless device 100 or, if the display 122 is a touch-screen, with the icons on the display 122 to cycle through the various types of information for display. The buttons may include one or more alarm buttons, activation and deactivation buttons, and the like. The display 122 may present text and data messages, confirmation messages, alert notifications, the network connection strength, and the type of mobile network data connection simultaneously. Alternatively, the display 122 may only present one type of information, for example, text and data messages corresponding to alerts, monitoring status, and the like. The display 122 may then present other types of information if the user interacts with buttons on the wireless device 100 or, if the display is a touch-screen, with icons on the display 122.

The wireless device 100 may also have the user interface 124 to facilitate use of the wireless device 100 with an operating system 112. The operating system 112 may be associated with a touchscreen controller, one or more communications components, one or more graphics components, one or more contact/motion components, and the like.

The memory 108 of the wireless device 100 may be an internal memory or a removable storage type such as a memory chip. The memory 108 may store information about the wireless device 100, including the default and/or current location. Another information storage type that the wireless device may use is a SIM card 116, which may be configured for use with machine-to-machine short message data services, emergency calling services, call-back calls from Public Service Answering Points, and the like. Additionally, the wireless device 100 may include the audio input/output device 120 for the input or output of sounds in data messages, alerts, phone calls, videos, music, and the like.

The processor 110 may be configured to execute the application 114. The processor 110 can be, for example, dedicated hardware as defined herein, a computing device as defined herein, a processor, a microprocessor, a programmable logic array (PLA), a programmable array logic (PAL), a generic array logic (GAL), a complex programmable logic device (CPLD), an application-specific integrated circuit (ASIC), a field-programmable gate array (FPGA), or any other programmable logic device (PLD) configurable to execute the application 114 and to facilitate the transmission of short data messages.

The application 114 may be an electronic application or software application configured to receive and process short message data service. The application 114 may be written in any programming language, such as, for example, C, Java, Objective-C, C+, Python, Visual Basic, Per, or any other programming language the processor 110 is capable of executing. The types of short message data services managed by the application 114 may include home security data and communications, personal emergency response systems, home automation and controls data, vehicular telematics such as vehicle location data, vehicle safety data, and vehicle security data, location tracking data, medical telematics data, personal health emergency data, fire alarm and control messaging, and the like.

For security, the short data messages may be encrypted by the application 114. Encryption by the application 114 may occur before the short data message is transmitted to a radio for a carrier network. While some host-encrypted messages may use 64 bit encryption, the application 114 may encrypt the short data messages with 128 bit encryption for additional security. The application 114 may also provide additional radio device authentication security for the carrier network.

The wireless device 100 may also be connected to one or more sensors 126. The connection with the one or more sensors 126 may be via a communication channel 128 or may be wired. The one or more sensors 126 may be motion sensors, magnetic sensors, or the like, and may detect alerts which may be communicated to the wireless device 100. For example, if a sensor 126 detects a motion alert, the sensor 126 may communicate the alert to the wireless device 100, which may communicate the alert via a data message. In other aspects, other types of sensors 126 consistent with other aspects may similarly communicate a data message.

In another aspect of the disclosure, the wireless device 100 and the one or more sensors 126 may be remotely controlled by a remote control 130. The remote control 130 may communicate with the wireless device 100 and the one or more sensors 126 via the communication channel 128 to activate or deactivate the wireless device 100, any of the sensors 126, to change settings, and to command the wireless device 100 to transmit a data message. The wireless device 100 may also be remotely controlled by a monitoring service, which could be operated by a user or by one or more computers. For example, a home security system relying on the wireless device 100 may transmit data and messages to the wireless device 100, may activate or deactivate the wireless device 100, and may control any of the sensors 126 in order to perform security monitoring functions and the like.

The short data messages may also use a variety of underlying technologies. For example, the Global System for Mobile Communications (GSM) standard may use Unstructured Supplementary Service Data (USSD) protocol. USSD messages may allow for real-time transmission of messages during a two-way exchange of data. Code Division Multiple Access (CDMA) technology may use a Feature Request (FEATREQ) protocol. Long-Term Evolution (LTE) technology may use USSD using multiple IP Multimedia (IM) Core Network (CN) subsystem IMS. It should be noted that any similar protocol providing short data messages is contemplated by the disclosure as well including any future improvements to the above.

The USSD messages may be up to 182 alphanumeric characters in length. The USSD messages may create a real-time connection during a USSD session. The connection may remain open, allowing a two-way exchange of a sequence of data. In one aspect, the USSD messages may utilize USSD Phase 1, as specified in GSM 02.90. In one aspect, the USSD messages may utilize the core network and the message may be delivered over a MAP (Mobile Application Part). In one aspect, the USSD messages may utilize USSD Phase 2, as specified in GSM 03.90. In one aspect, the USSD messages may utilize a USSD Gateway that may route the USSD messages from a signaling network to a service application and back. In one aspect a USSD gateway service may be utilized. In one aspect, the gateway may be a collection of hardware and software required to interconnect two or more disparate networks, including performing protocol conversion. In one aspect, the USSD may be implemented as a session-based protocol. In one aspect, the USSD messages may travel over GSM signaling channels and may be used to query information and trigger services consistent with the disclosure. In one aspect, a USSD process establishes a real time session between mobile handset and application handling the service.

Figure 3:
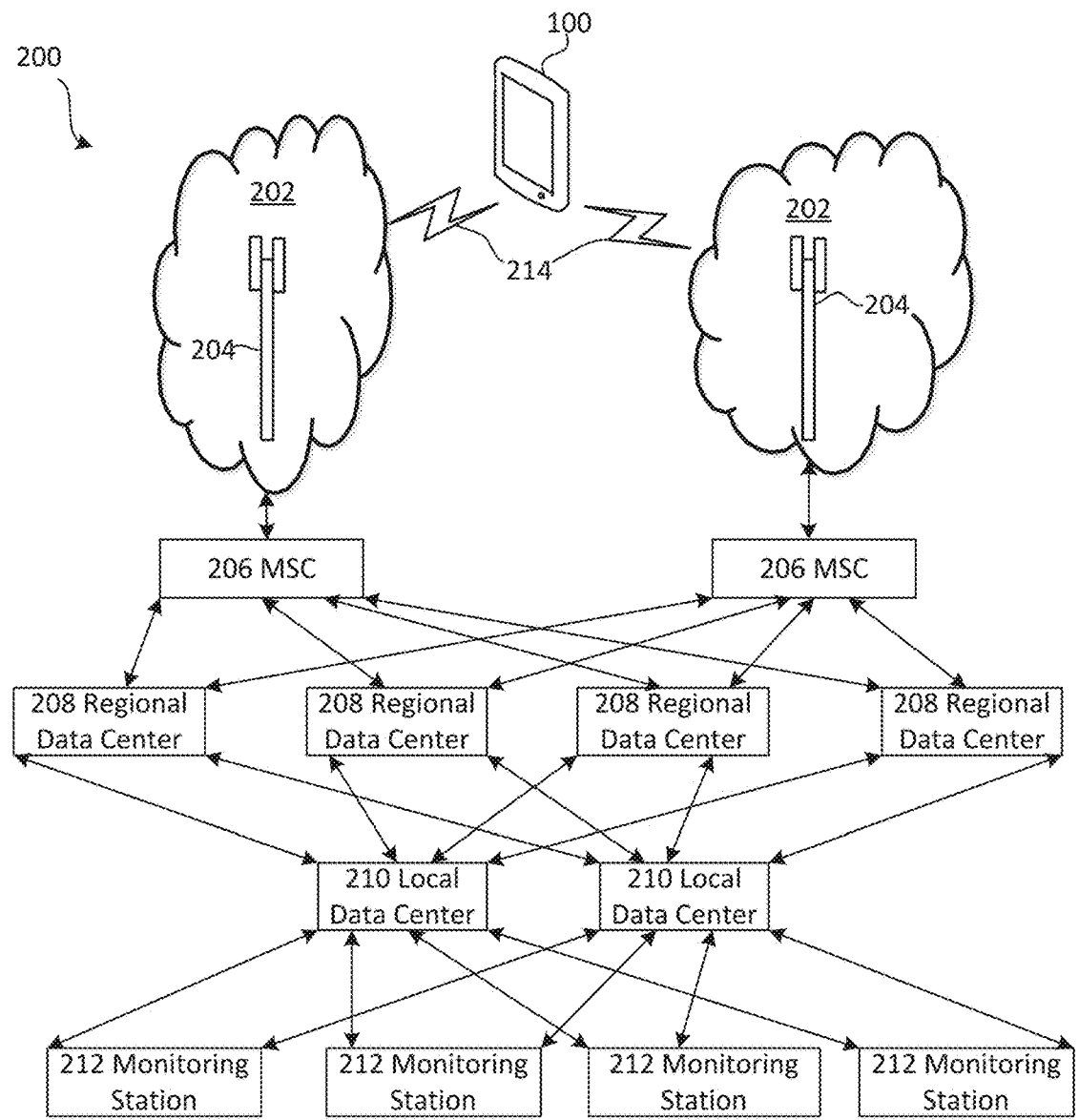
FIG. 3 illustrates a cellular signaling system which may allow for reliable, real-time transmitting and processing of short data messages, in accordance with aspects of the disclosure.

FIG. 3 illustrates a cellular signaling system 200 which may allow for reliable, real-time transmitting and processing of short data messages. The cellular signaling system 200 may include the wireless device 100, one or more carriers 202 with one or more base transceiver stations 204, one or more mobile switch centers 206, one or more regional data centers 208, one or more local data centers 210, one or more monitoring stations 212, and the like. The one or more monitoring stations 212 may be implemented in a server as defined herein. The one or more carriers 202 may have the one or more base transceiver stations 204 which may facilitate communication between the wireless device 100 and the networks provided by the carriers 202. The base transceiver stations 204 may communicate in a variety of ways, such as with GSM, CDMA, LTE, 5G, Wi-Fi, and the like.

The one or more monitoring stations 212 may have one or more transceivers to receive and transmit short data messages. The one or more monitoring stations 212 may also have one or more servers, computers, processors, and the like to process and respond to the short data messages. In one aspect, the one or more monitoring stations 212 may receive a short data message and determine whether an emergency authority should be notified. For example, in the case of a short data message communicating a fire alarm, the one or more monitoring stations 212 may determine that a fire emergency service should be contacted and notified of the alert. The one or more monitoring stations 212 may transmit short data messages to the proper authority or may place a phone call to the proper authority. In another aspect, an operator of the one or more monitoring stations 212 may analyze the received short data message and may respond by sending a short data message to the proper authority or by calling the proper authority.

The wireless device 100 may be a mobile device, an alarm panel, a controller, a fire alarm, or the like. The wireless device 100 may wirelessly connect via a communication channel 214 to the one or more carriers 202. The one or more carriers 202 may connect with one or more mobile switch centers 206. Alternatively, the mobile switch centers 206 may be a part of the network of the carrier 202. The one or more mobile switch centers 206 may be part of one or more network switching subsystems and may facilitate call initiation, release, routing of calls and messages, and the like. The mobile switch centers 206 may connect to a public switched telephone network which may be a network of circuit-switched telephone networks. The one or more mobile switch centers 206 may be able to determine the location of the wireless device 100 to efficiently route calls and messages.

The one or more mobile switch centers 206 may route calls and messages between one or more regional data centers 208, which may be positioned to route calls and messages between corresponding geographic regions such as West, East, Midwest, South, and the like. From the regional data centers 208, calls and messages may be routed between local data centers 210 in a particular state, city, or other locality. The regional data centers 208 and the local data centers 210 may each have Quad Core Connectivity or the like with a high-speed processor, a transceiver, one or more integrated circuits, a location device, and the like.

Phone lines, mobile networks, VOIP, the Internet, and the like may transmit communication signals to one or more monitoring stations 212. The communication signals may represent alarm signals, and the monitoring stations 212 may be alarm monitoring companies or the like depending on the kind of message transmitted to/from the wireless device 100. The regional data centers 208 and the local data centers 210 may communicate with one another and/or with the monitoring stations 212 via a Virtual Private Network or the like. For example, the wireless device 100 may transmit one or more calls and short data messages which can be routed and processed by the cellular signaling system 200, resulting in alerts being received by one or more monitoring stations 212 corresponding to the location of the wireless device 100 and/or any phone numbers stored on the wireless device 100. The monitoring stations 212 may receive the short data messages and may respond to any corresponding alerts. For example, if the short data messages communicate a fire alarm, the monitoring stations 212 may alert the proper authority. Monitoring stations 212 may also transmit messages to the wireless device 100 and/or may generate phone calls in response to detected alerts or malfunctions with the wireless device 100. For example, in the case of an intruder alert, the monitoring station 212 may generate a phone call to confirm with a resident using the wireless device 100 that the alert is not accidental.

One advantage of the cellular signaling system 200 in FIG. 3 may be that the cellular signaling system 200 may be configured to transmit data messages in real-time. Using GSM terms, for example, the cellular signaling system 200 may utilize U.S. Satellite Broadcasting services or the like to transmit the short data messages between the wireless device 100 and another device. The short data messages transmitted by the cellular signaling system 200 may be significantly faster to transmit than SMS messages, for example, at least because they do not require TCP/IP headers and/or other overhead normally associated with TCP/IP sessions. The short data messages may be transmitted in real-time rather than via a store and forward technology, for example, in which communications are transmitted to a station, stored, and transmitted later to a final destination. Another benefit of the cellular signaling system 200 is that the cellular signaling system 200 may use an encrypted network, such as 128 bits or the like. The cellular signaling system 200 may also be carrier agnostic, allowing the wireless device 100 to communicate with different carriers 202 on a variety of platforms and technologies, such as 2G, 3G, HSPA, HSPA+ 4G/LTE, 5G, CDMA, and the like.

The cellular signaling system 200 may also have the ability to prioritize certain types of short data messages, such as critical or emergency messages. Using Control Channel Signaling, the cellular signaling system 200 may use one or more control channels to transmit critical short data messages even if voice channels and/or TCP/IP data sessions are unavailable. The control channel used in Control Channel Signaling may be a separate channel from normal voice or data channels. The control channel may also transmit data representing an establishment or termination of a connection, and may also transmit caller or messenger identification, location, and the like. The Control Channel Signaling used by the cellular signaling system 200 may implement Integrated Services Digital Networks, Signaling System 7, or other methods.

Figure 4:
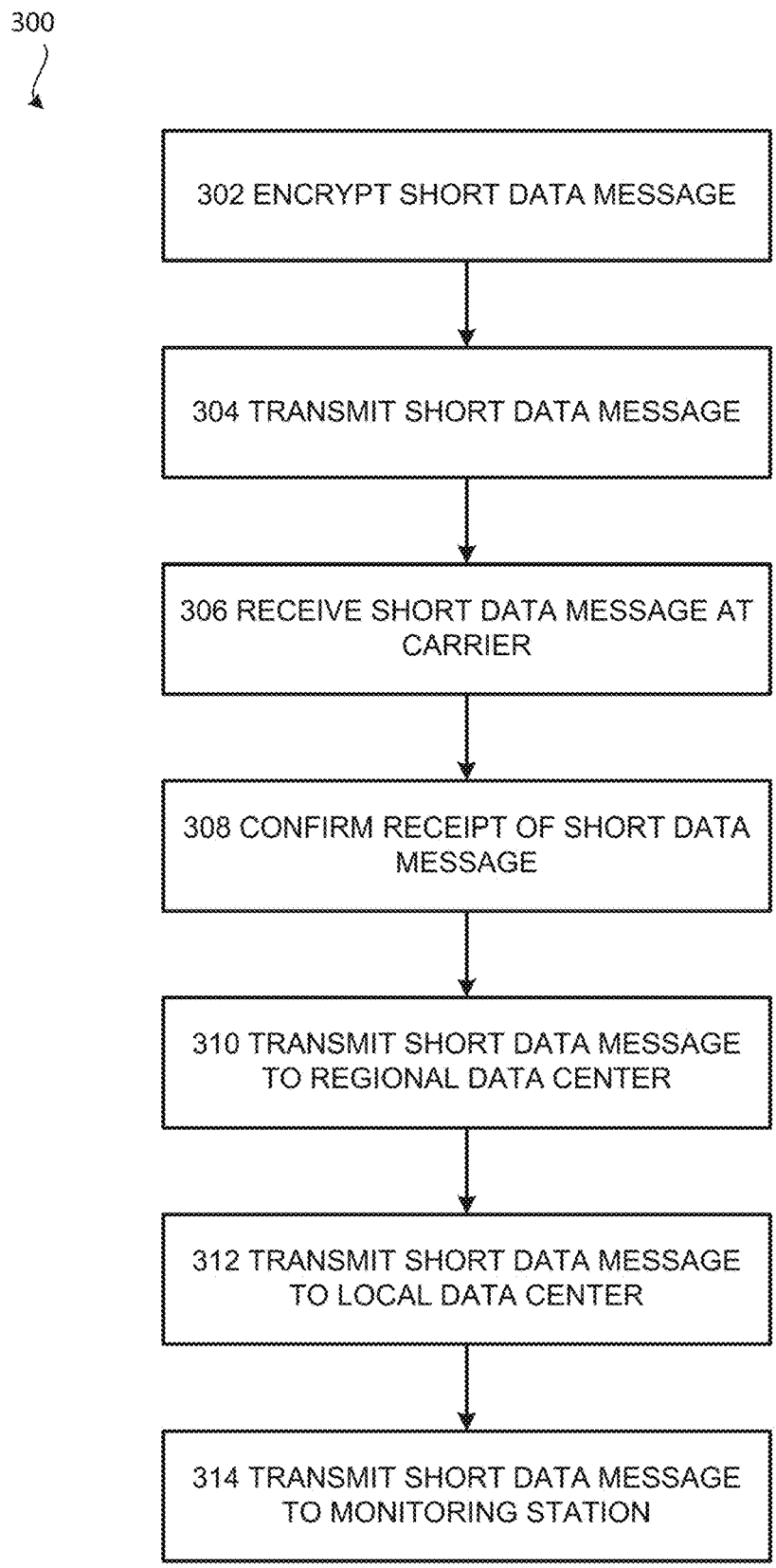
FIG. 4 shows the process for transmitting and processing short data message services with the cellular signaling system of FIG. 3, in accordance with aspects of the disclosure.

FIG. 4 shows the process 300 for transmitting and processing short data messages with the cellular signaling system 200 shown in FIG. 3. At step 302, the application 114 may encrypt the short data message using 128 bits or any other type of encryption. At step 304, the wireless device 100 may transmit the short data message, using the transceiver 102, to the carrier 202. The short data message may be related to an alert that has been detected, such as an intruder or a fire. At step 306, the carrier 202 may receive the short data message with a secure encrypted network using 128 bits or any other number of bits corresponding to the encryption of the short data message. At step 308, the carrier 202 may transmit a confirmation message to the wireless device 100 confirming that the short data message has been received. The confirmation message may include a date and time of the transmission, the identifying account number, and the like. If the short data message was not received by the carrier 202, the confirmation message may indicate a failure. At step 310, the carrier 202 may transmit the short data message to a regional data center 208. The regional data center 208 may receive the short data message and may transmit the short data message to the local data center 210 at step 312. Once the local data center 210 has received the short data message, the local data center 210 may transmit the short data message to the monitoring station 212 at step 314. The monitoring station 212 may transmit data to the wireless device 100, may notify any authorities such a police and fire departments of an alert detected by the wireless device 100 or the like.

Accordingly, the disclosure as described is directed to a device, system, and process for transmitting and processing short message data services for devices utilizing mission critical communications. These two-way messages can be delivered up to seven times faster than SMS communications. Wireless TCP/IP sessions and their associated overhead are not required for the messages. The messages can be transmitted even if voice channels or TCP/IP data sessions are unavailable. The messages have high security and the messages can be encrypted by the host application before being passed to a radio (PCI/HIPA compliance).

Host encrypted and non-encrypted messages may be transported with radio device authentication security and 128 bit encryption. The messages are very cost effective. According to the disclosure, the messages are fast, cost effective, and highly secure solutions. For example, the disclosure provides solutions that can meet/exceed National Fire Protection Association for single communications path consistent with NFPA 72 National Fire Alarm And Signaling Code 2013 addition.

Further in accordance with various aspects of the disclosure, the methods described herein are intended for operation with dedicated hardware implementations including, but not limited to PCs, PDAs, SIM cards, semiconductors, application specific integrated circuits (ASIC), programmable logic arrays, cloud computing devices, and other hardware devices constructed to implement the methods described herein.

The disclosure may include communication channels that may be any type of wired or wireless electronic communications network, such as, e.g., a wired/wireless local area network (LAN), a wired/wireless personal area network (PAN), a wired/wireless home area network (HAN), a wired/wireless wide area network (WAN), a campus network, a metropolitan network, an enterprise private network, a virtual private network (VPN), an internetwork, a backbone network (BBN), a global area network (GAN), the Internet, an intranet, an extranet, an overlay network, a cellular telephone network, a Personal Communications Service (PCS), using known protocols such as the Global System for Mobile Communications (GSM), CDMA (Code-Division Multiple Access), W-CDMA (Wideband Code-Division Multiple Access), Wireless Fidelity (W-Fi), Bluetooth, Long Term Evolution (LTE), 5G, EVolution-Data Optimized (EVDO) and/or the like, and/or a combination of two or more thereof.

The disclosure may be implemented in any type of computing devices, such as, e.g., a desktop computer, personal computer, a laptop/mobile computer, a personal data assistant (PDA), a mobile phone, a tablet computer, cloud computing device, and the like, with wired/wireless communications capabilities via the communication channels.

In an embodiment, the disclosure may be implemented in any type of mobile smartphones that are operated by any type of advanced mobile data processing and communication operating system, such as, e.g., an Apple™ iOS™ operating system, a Google™ Android™ operating system, a RIM™ Blackberry™ operating system, a Nokia™ Symbian™ operating system, a Microsoft™ Windows Mobile™ operating system, a Microsoft™ Windows Phone™ operating system, a Linux™ operating system or the like.

It should also be noted that the software implementations of the disclosure as described herein are optionally stored on a tangible storage medium, such as: a magnetic medium such as a disk or tape; a magneto-optical or optical medium such as a disk; or a solid state medium such as a memory card or other package that houses one or more read-only (non-volatile) memories, random access memories, or other re-writable (volatile) memories. A digital file attachment to email or other self-contained information archive or set of archives is considered a distribution medium equivalent to a tangible storage medium. Accordingly, the disclosure is considered to include a tangible storage medium or distribution medium, as listed herein and including art-recognized equivalents and successor media, in which the software implementations herein are stored.

According to an example, the global navigation satellite system (GNSS) may include a device and/or system that may estimate its location based, at least in part, on signals received from space vehicles (SVs). In particular, such a device and/or system may obtain "pseudorange" measurements including approximations of distances between associated SVs and a navigation satellite receiver. In a particular example, such a pseudorange may be determined at a receiver that is capable of processing signals from one or more SVs as part of a Satellite Positioning System (SPS). Such an SPS may comprise, for example, a Global Positioning System (GPS), Galileo, Glonass, to name a few, or any SPS developed in the future. To determine its location, a satellite navigation receiver may obtain pseudorange measurements to three or more satellites as well as their positions at time of transmitting. Knowing the SV orbital parameters, these positions can be calculated for any point in time. A pseudorange measurement may then be determined based, at least in part, on the time a signal travels from an SV to the receiver, multiplied by the speed of light. While techniques described herein may be provided as implementations of location determination in GPS and/or Galileo types of SPS as specific illustrations according to particular examples, it should be understood that these techniques may also apply to other types of SPS, and that claimed subject matter is not limited in this respect.

Additionally, the various aspects of the disclosure may be implemented in a non-generic computer implementation. Moreover, the various aspects of the disclosure set forth herein improve the functioning of the system as is apparent from the disclosure hereof. Furthermore, the various aspects of the disclosure involve computer hardware that it specifically programmed to solve the complex problem addressed by the disclosure. Accordingly, the various aspects of the disclosure improve the functioning of the system overall in its specific implementation to perform the process set forth by the disclosure and as defined by the claims.

Aspects of the disclosure may include a server executing an instance of an application or software configured to accept requests from a client and giving responses accordingly. The server may run on any computer including dedicated computers. The computer may include at least one processing element, typically a central processing unit (CPU), and some form of memory. The processing element may carry out arithmetic and logic operations, and a sequencing and control unit may change the order of operations in response to stored information. The server may include peripheral devices that may allow information to be retrieved from an external source, and the result of operations saved and retrieved. The server may operate within a client-server architecture. The server may perform some tasks on behalf of clients. The clients may connect to the server through the network on a communication channel as defined herein. The server may use memory with error detection and correction, redundant disks, redundant power supplies and so on.

While the device, system, and method have been described in terms of what are presently considered to be specific aspects, the disclosure need not be limited to the disclosed aspects. It is intended to cover various modifications and similar arrangements included within the spirit and scope of the claims, the scope of which should be accorded the broadest interpretation so as to encompass all such modifications and similar structures. The present disclosure includes any and all aspects of the following claims.

The invention claimed is:

1. A system configured to transmit short data messages, the system comprising a wireless device comprising:
   a transceiver configured to transmit the short data messages to a wireless network, the wireless network configured to route the short data messages to a data center; and the short data messages comprise short data messages other than Short Message Service (SMS) messages;
   at least one sensor configured to detect at least one of the following: a physical parameter, a user input or a sensor input;
   a processor configured to control the transceiver and to execute an application:
   the processor further configured to execute the application to implement at least one of the following: home security operations, personal emergency response operations, home automation operations, user location operations, fire alarm operations, vehicle telematics operations, or medical telematics operations;
   the processor further configured to execute the application and monitor the at least one sensor to generate data comprising at least one of the following: home security data, data associated with a physical health emergency, home automation data, vehicle related data, location data, medical data, or fire alert data; and
   the transceiver further configured to transmit the short data messages to the wireless network with the data from the processor and the wireless network configured to route the short data messages to the data center with the data from the processor;
   a computer readable medium to store the application; and
   the wireless device and the at least one sensor are configured to communicate with a remote control,
   wherein the data center is configured to route the short data messages from the wireless network to a monitoring station;
   wherein the monitoring station is configured to monitor at least one of the following: the home security operations, the personal emergency response operations, the home automation operations, the user location operations, the fire alarm operations, the vehicle telematics operations, or the medical telematics operations;
   wherein the remote control is configured to at least one of the following: communicate with the wireless device, communicate with the at least one sensor, activate the wireless device, deactivate the wireless device, or command the wireless device to transmit the short data messages to the data center;
   wherein the short data messages comprise Unstructured Supplementary Service Data messages that create a real-time connection during an Unstructured Supplementary Service Data session such that the short data messages are transmitted substantially faster than the SMS messages are operable to be transmitted, wherein the faster transmission is based on the short data messages not having a plurality of header bits associated with a transmission control protocol (TCP)/Internet protocol (IP) session, the header bits being present in the transmittable SMS messages; and
   wherein the transceiver is further configured to transmit and receive the short data messages utilizing at least one of the following:
      a Global System for Mobile Communications standard Unstructured Supplementary Service Data protocol, or
      a Long-Term Evolution Unstructured Supplementary Service Data protocol using a multiple IP Multimedia Core Network subsystem.

2. The system of claim 1, wherein:
the wireless device is configured to be connected to the at least one sensor via a wireless communication channel or a wired connection;
the Unstructured Supplementary Service Data messages utilize at least one of the following: an Unstructured Supplementary Service Data Phase 1 as specified in GSM 02.90 or an Unstructured Supplementary Service Data Phase 2 as specified in GSM 03.90; and
the data center is further configured to route the short data messages to the monitoring station via a Virtual Private Network.

3. The system of claim 1, wherein:
the application is configured to implement the vehicle telematics operations;
the short data messages comprise the vehicle related data; and
the wireless device is operatively linked to a vehicle.

4. The system of claim 3, wherein:
the at least one sensor is configured to detect at least one of a vehicle location, vehicle safety data, or vehicle security data, and wherein the short data messages comprise the vehicle related data comprising at least one of the vehicle location, the vehicle safety data, or the vehicle security data;
the transceiver is further configured to transmit and receive the short data messages utilizing the Unstructured Supplementary Service Data protocol; and
the short data messages are configured to comprise up to 182 alphanumeric characters.

5. The system of claim 1, wherein:
the application is configured to implement the user location operations;
the wireless device is further configured to track a location of a user; and
the short data messages comprise the location data.

6. The system of claim 1, wherein:
the processor further configured to execute the application to encrypt the short data messages and to communicate with the at least one sensor;
the application is further configured to implement the medical telematics operations;
the at least one sensor is configured to detect the medical data; and
the short data messages comprise the medical data.

7. The system of claim 1, wherein:
the processor further configured to execute the application to encrypt the short data messages and to communicate with the at least one sensor;
the application is configured to implement the home security operations;
the wireless device is a home security system;
the short data messages comprise the home security data; and
the at least one sensor is at least one of the following: a door sensor, a window sensor, or a motion sensor.

8. The system of claim 1, wherein:
the processor further configured to execute the application to encrypt the short data messages and to communicate with the at least one sensor;
the application is configured to implement the personal emergency response operations;
the wireless device is a personal emergency response system;
the at least one sensor is configured to receive the user input representing a physical health emergency; and
the short data messages comprise the data associated with the physical health emergency.

9. The system of claim 1, wherein:
the processor further configured to execute the application to encrypt the short data messages and to communicate with the at least one sensor;
the application is configured to implement the home automation operations;
the wireless device is a home automation system;
the short data messages comprise the home automation data; and
the wireless device is further configured to communicate with one or more other wireless devices.

10. The system of claim 1, wherein:
the application is configured to implement the fire alarm operations; and
the wireless device is a fire alarm and the short data messages comprise the fire alert data.

11. A process for transmitting short data messages between a wireless device, a data center, and a monitoring station, the process comprising:
transmitting short data messages with a transceiver to a wireless network, the wireless network configured to route the short data messages to the data center, and the short data messages comprise short data messages other than Short Message Service (SMS) messages;
sensing with at least one sensor at least one of the following: a physical parameter, a user input, or a sensor input;
communicating with the at least one sensor with a processor;
implementing with the processor an application, the processor executing the application to implement at least one of the following: home security operations, personal emergency response operations, home automation operations, user location operations, fire alarm operations, vehicle telematics operations, or medical telematics operations;
storing the application in a computer readable medium;
monitoring the at least one sensor with the processor executing the application and generating data comprising at least one of the following: home security data, data associated with a physical health emergency, home automation data, vehicle related data, location data, medical data, or fire alert data;
transmitting with the transceiver the short data messages to the wireless network with the data from the processor and the wireless network configured to route the short data messages to the data center with the data from the processor;
routing the short data messages from the data center to the monitoring station; and
implementing the wireless device and the at least one sensor to communicate with a remote control,
wherein the remote control is configured to at least one of the following: communicate with the wireless device, communicate with the at least one sensor, activate the wireless device, deactivate the wireless device, or command the wireless device to transmit the short data messages to the data center;
wherein the monitoring station is configured to monitor at least one of the following: the home security operations, the personal emergency response operations, the home automation operations, the user location operations, the fire alarm operations, the vehicle telematics operations, or the medical telematics operations;
wherein the transmitting with the transceiver further comprises transmitting and receiving the short data messages utilizing at least one of the following:
a Global System for Mobile Communications standard Unstructured Supplementary Service Data protocol, or
a Long-Term Evolution Unstructured Supplementary Service Data protocol using a multiple IP Multimedia Core Network subsystem; and wherein the Unstructured Supplementary Service Data protocol is used to create a real-time connection during an Unstructured Supplementary Service Data session such that the short data messages are transmitted substantially faster than the SMS messages are operable to be transmitted, wherein the faster transmission is based on the short data messages not having a plurality of header bits associated with a TCP/IP session, the header bits being present in the transmittable SMS messages.

12. The process of claim 11, wherein:
the wireless device is configured to be connected to the at least one sensor via a wireless communication channel or a wired connection;
the application is configured to implement the vehicle telematics operations;
the short data messages comprise the vehicle related data; and
the wireless device is operatively linked to a vehicle.

13. The process of claim 12, wherein:
the at least one sensor is configured to detect at least one of a vehicle location, vehicle safety data, or vehicle security data, and wherein the short data messages comprise the vehicle related data comprising at least one of the vehicle location, the vehicle safety data, or the vehicle security data;
the transceiver is further configured to transmit and receive the short data messages utilizing the Unstructured Supplementary Service Data protocol; and
the short data messages are configured to comprise up to 182 alphanumeric characters.

14. The process of claim 11, wherein:
the application is configured to implement the user location operations;
the wireless device is further configured to track a location of a user; and
the short data messages comprise the location data.

15. The process of claim 11, wherein:
the data center is further configured to route the short data messages to the monitoring station via a Virtual Private Network;
the application is further configured to implement the medical telematics operations;
the at least one sensor is configured to detect the medical data; and
the short data messages comprise the medical data.

16. The process of claim 11, wherein:
the application is configured to implement the fire alarm operations; and
the wireless device is a fire alarm and the short data messages comprise the fire alert data.

17. The process of claim 11, wherein at least one of the following is used: an Unstructured Supplementary Service Data Phase 1 as specified in GSM 02.90 or an Unstructured Supplementary Service Data Phase 2 as specified in GSM 3.90.

18. The process of claim 11, wherein:
the application is configured to implement the home security operations;
the wireless device is a home security system;
the short data messages comprise the home security data; and
the at least one sensor is at least one of the following: a door sensor, a window sensor, or a motion sensor.

19. The process of claim 11, wherein:
the application is configured to implement the personal emergency response operations;
the wireless device is a personal emergency response system;
the at least one sensor is configured to receive the user input representing a physical health emergency; and
the short data messages comprise the data associated with the physical health emergency.

20. The process of claim 11, wherein:
the application is configured to implement the home automation operations;
the wireless device is a home automation system;
the short data messages comprise the home automation data; and
the wireless device is further configured to communicate with one or more other wireless devices.

* * * * *